US009304510B2

(12) United States Patent
Hoopes et al.

(10) Patent No.: US 9,304,510 B2
(45) Date of Patent: Apr. 5, 2016

(54) METHOD AND PROCESS OF VERIFYING PHYSICAL CONNECTIONS WITHIN A MATERIAL HANDLING SYSTEM

(71) Applicants: Mark Hoopes, Oil City, PA (US); Randy Timblin, Youngstown, OH (US)

(72) Inventors: Mark Hoopes, Oil City, PA (US); Randy Timblin, Youngstown, OH (US)

(73) Assignee: IPEG, Inc., Wilmington, DE (US)

( * ) Notice: Subject to any disclaimer, the term of this patent is extended or adjusted under 35 U.S.C. 154(b) by 323 days.

(21) Appl. No.: 13/766,043

(22) Filed: Feb. 13, 2013

(65) Prior Publication Data
US 2013/0211572 A1     Aug. 15, 2013

Related U.S. Application Data

(60) Provisional application No. 61/598,018, filed on Feb. 13, 2012.

(51) Int. Cl.
*G06F 19/00* (2011.01)
*G05B 19/418* (2006.01)
*B65G 53/66* (2006.01)

(52) U.S. Cl.
CPC ............ *G05B 19/4189* (2013.01); *B65G 53/66* (2013.01); *G05B 2219/25296* (2013.01)

(58) Field of Classification Search
CPC .. H01R 13/64; H01R 13/641; G05B 19/4189; G05B 19/418; G05B 2219/25294; G05B 2219/25296

USPC ......................................................... 700/112
See application file for complete search history.

(56) References Cited

U.S. PATENT DOCUMENTS

| | | | | |
|---|---|---|---|---|
| 5,821,510 A * | 10/1998 | Cohen et al. | ................. | 235/375 |
| 5,984,716 A * | 11/1999 | Starkey | ..................... | 439/488 |
| 5,996,889 A * | 12/1999 | Fuchs et al. | .................... | 235/375 |
| 6,450,538 B2 * | 9/2002 | Errard | ............................ | 283/72 |
| 6,860,468 B1 * | 3/2005 | Morin | .................. | F16K 35/027 |
| | | | | 137/614.06 |
| 8,651,892 B2 * | 2/2014 | Arant | ........................... | 439/489 |
| 2006/0237594 A1 * | 10/2006 | Najmabadi et al. | ........... | 244/195 |
| 2011/0168778 A1 * | 7/2011 | Talboys | .................... | 235/462.1 |
| 2013/0340998 A1 * | 12/2013 | Flusche | ..................... | E21B 7/02 |
| | | | | 166/65.1 |

* cited by examiner

*Primary Examiner* — Michael D Masinick
(74) *Attorney, Agent, or Firm* — Louis A. DePaul; Reed Smith LLP

(57) ABSTRACT

Manufacturing and industrial processes that involve the transfer of materials from source locations to destination location may utilize the presently described system and process to verify that the correct physical connections are established and maintained in a material handling system. The system collects information related to individual physical connections, including machine-identifiable indicia, and compares this information to data that defines the intended connections within the material handling system. In doing so, the system and process verify whether the proper physical connections are in place.

3 Claims, 4 Drawing Sheets

METHOD AND PROCESS OF VERIFYING PHYSICAL CONNECTIONS WITHIN A MATERIAL HANDLING SYSTEM

CROSS-REFERENCE TO RELATED APPLICATION

This application claims the benefit under 35 U.S.C. 119(e) of U.S. Provisional Application No. 61/598,018 filed Feb. 13, 2012.

FIELD OF THE INVENTION

The present invention relates to a verification process for use, for example, in industrial material handling processes that involve the transfer of materials between source and destination locations.

BACKGROUND OF THE INVENTION

Many industrial manufacturing processes involve the transfer of materials from source locations, such as storage drums, bins, silos, etc., to destination locations, such as reactor vessels, loading and blending equipment, etc. In such processes, it is critical that material from the correct source location material be transferred to the correct destination location. Transfer of the material from an incorrect source location may cause numerous problems, including lost time and materials, defective production material, etc., thereby increasing the time and cost of the manufacturing process.

Materials are commonly transferred to destination locations by first establishing a physical connection between a source location and destination location, through the use of a conduit such as a hose, pipe, or other means of material transfer or conveyance, and then transferring the material, by way of that physical connection, using pumps, vacuum pressure, or other means of material transfer or conveyance. Connecting source and destination locations is commonly accomplished by a human operator.

Traditionally, a human operator makes the proper connections and then that operator (or another operator) visually confirms that the proper connections have been made between the source and the destination locations. For example, if the human operator's instructions require that material from source location "$S_1$" be transferred to destination location "$D_2$", the human operator visually inspects the respective physical connection and confirms that source location "$S_1$" and destination location "$D_2$" has been connected before initiating the transfer of material.

In addition to a human operator's visual confirmation, some processes may utilize additional verification procedures including, for example, the use of a ground wire and electrical current to measure connectivity of a source/destination connection, or radio-frequency identification (RFID) to identify the presence of a connection between a source and destination. However, these techniques are imperfect. Electrical signals may be compromised by static electricity or other interference, and RFID processes are susceptible to interference and/or degradation from radio frequency generated by the machines and moving parts commonly found in industrial and material-handling environments. Moreover, the costs associated with implementing and maintaining electrical and RFID devices can be prohibitive.

As a result of unavoidable human error in various material handling processes and the shortcomings of existing technology used to augment an operator's visual inspection, there is a desire to have a system and process to reliably and economically identify the physical connections made between source end destination locations.

SUMMARY OF THE INVENTION

The present invention is a system and process that verifies the physical connection between source and destination locations through the use of machine-identifiable indicia, a camera or other device capable of recognizing such indicia, and a programmable logic controller (PLC), or similar device, and associated programming. Through the use of a camera or other remote device that is used to identify the machine-identifiable indicia, the present invention verifies connections from a point removed from the actual physical connection between source and destination locations. As a result, the present invention is less susceptible to the physical and electrical disturbances commonly found in material handling environments. The present invention thus provides a more reliable and durable solution for the verification of physical connections in various material handling processes, thereby reducing the likelihood that incorrect material is introduced into a given manufacturing process.

BRIEF DESCRIPTION OF THE DRAWINGS

The present invention and its presently preferred embodiments will be better understood by way of reference to the detailed disclosure below and to the accompanying drawings, wherein.

DETAILED DESCRIPTION OF THE PREFERRED EMBODIMENTS

Figure 1:
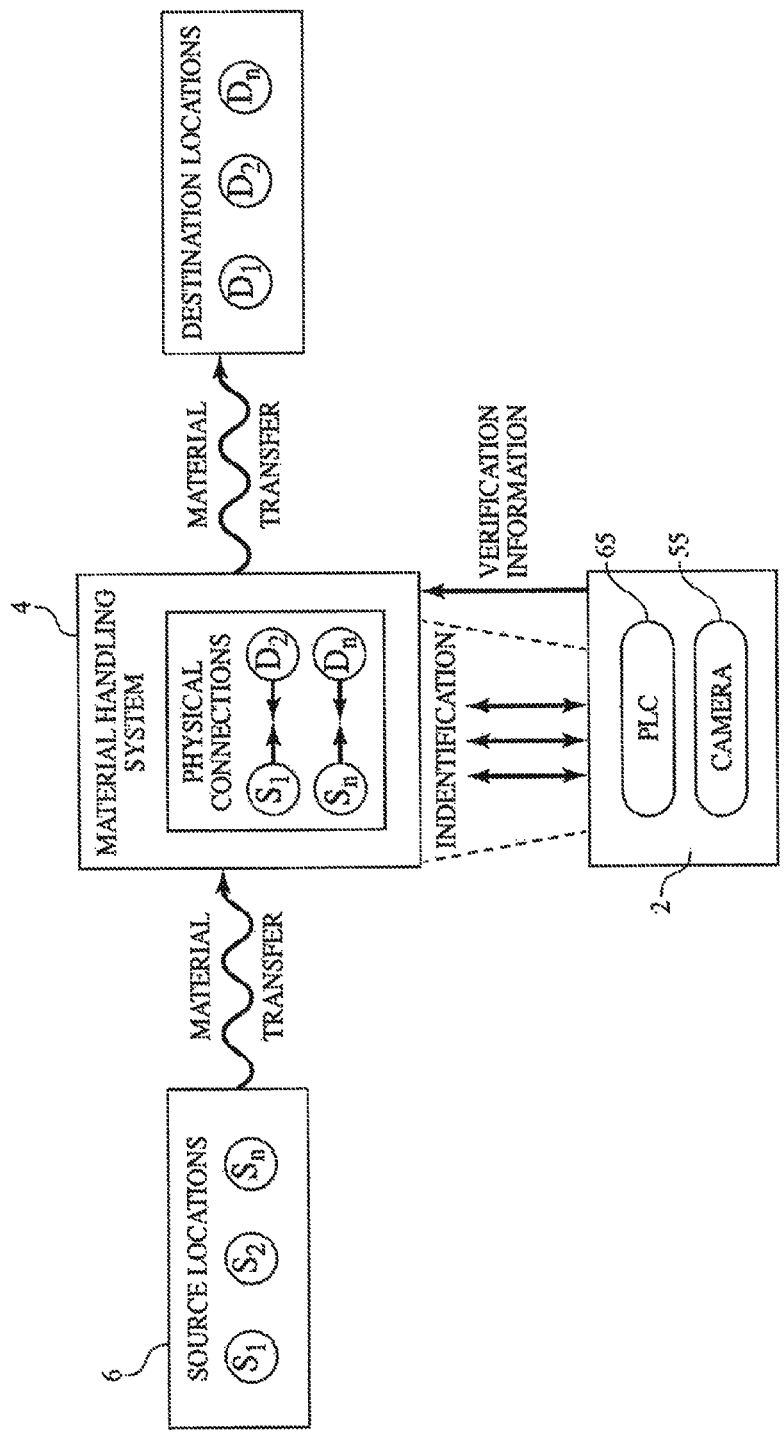
FIG. 1 is a schematic that summarizes the primary elements of a preferred embodiment and the relationship between the verification and material handling systems.

As depicted in FIG. 1, the identification system 2 described by the present invention is designed to interface with known material handling systems 4 which manage the transfer of bulk materials from source locations 6 to destination locations 8. The source location 6 may be a drum, bin, silo, or other vessel that holds or delivers source material. The destination location 8 may be a reactor, material-loading equipment, or other vessel that is intended to receive source material.

The identification system 2 described by the present invention is designed to identify which physical connections are actually established within the material handling system 4. After identifying these connections, the identification system 2 provides this information to the material handling system 4 which determines whether the physical connections identified by the identification system 2 are the same connections that the material handling system 4 instructed the human operator to establish. In the event an unintended physical connection is identified, the material handling system 4 can take necessary steps to prevent an unintended material transfer between a source location 6 and a destination location 8. These steps include, for example, (i) disabling the conveying means, such as vacuum or pump pressure, between source and destination locations, or (ii) closing a valve to prevent material transfer between source and destination locations. In another embodiment, the identification system 2 can be programmed to perform the comparison of the physical connections and the intended connections, and then send the results of the comparison, including the identity of any unintended connections, to the material handling system 4.

Figure 2:
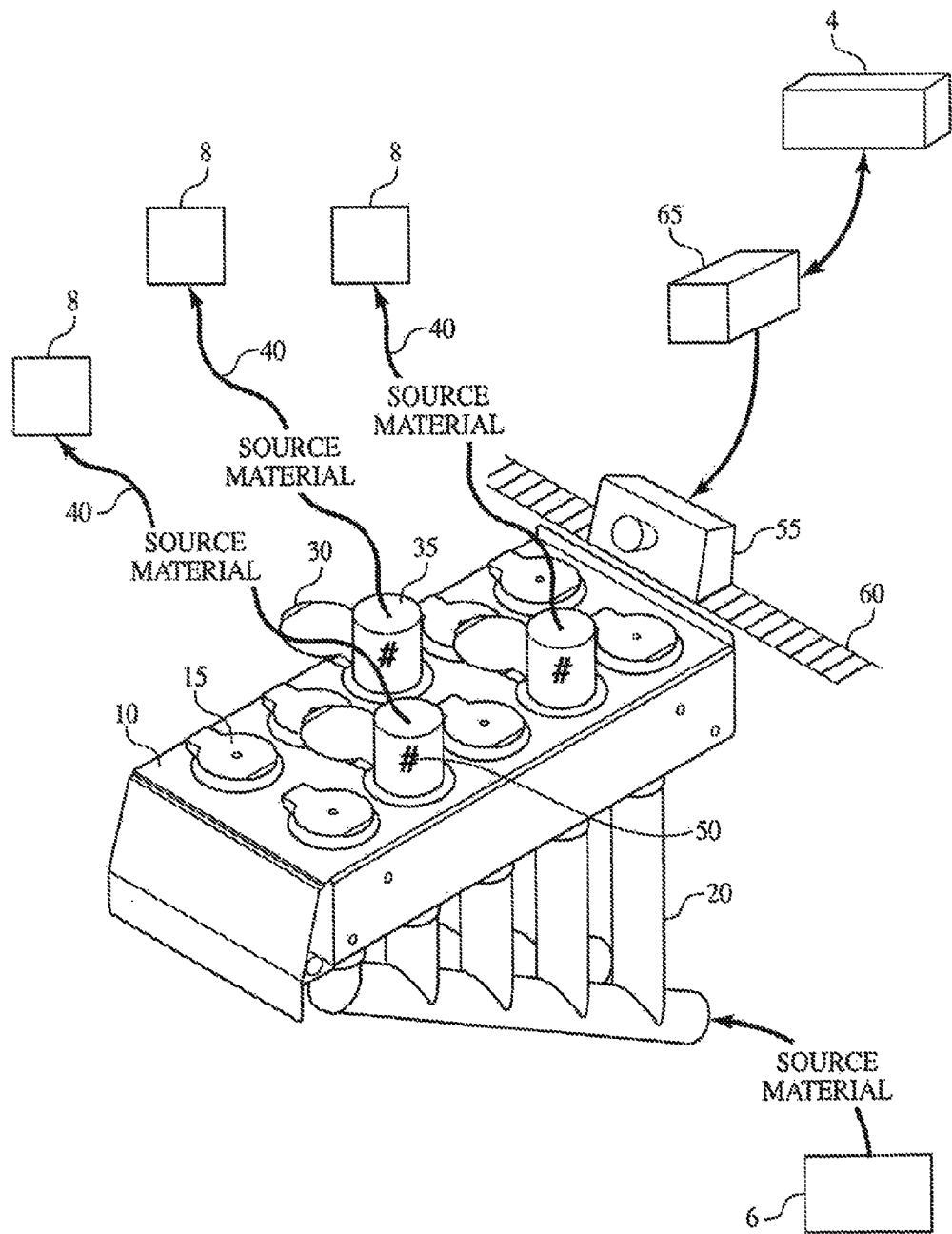
FIG. 2 is a perspective view of a selector plate and associated material handling equipment according to a preferred embodiment of the present invention.
Figure 3:
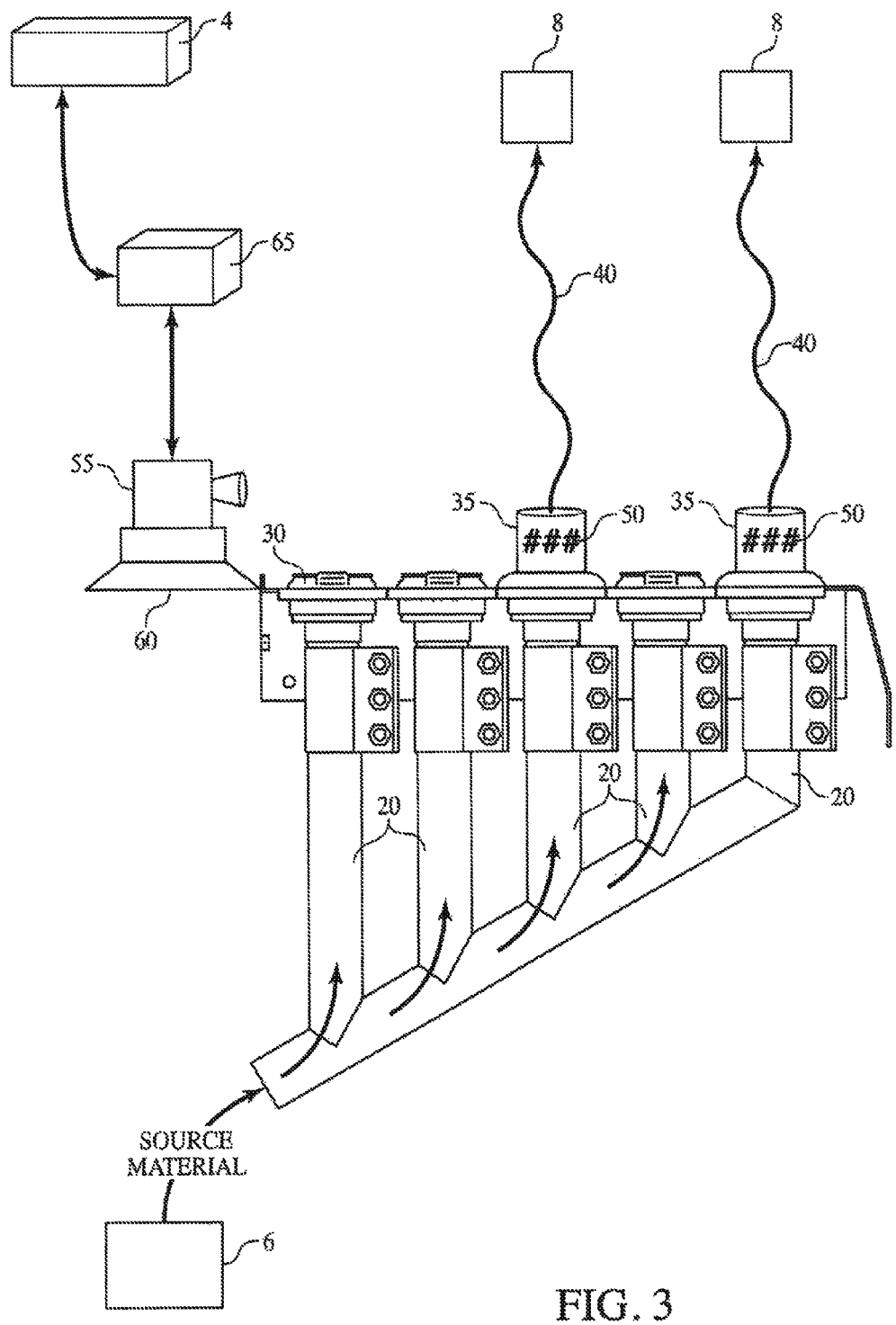
FIG. 3 is a side view of a selector plate and associated material handling equipment according to a preferred embodiment of the present invention, along with schematic elements that show the relationship between the verification and material handling systems.
Figure 4:
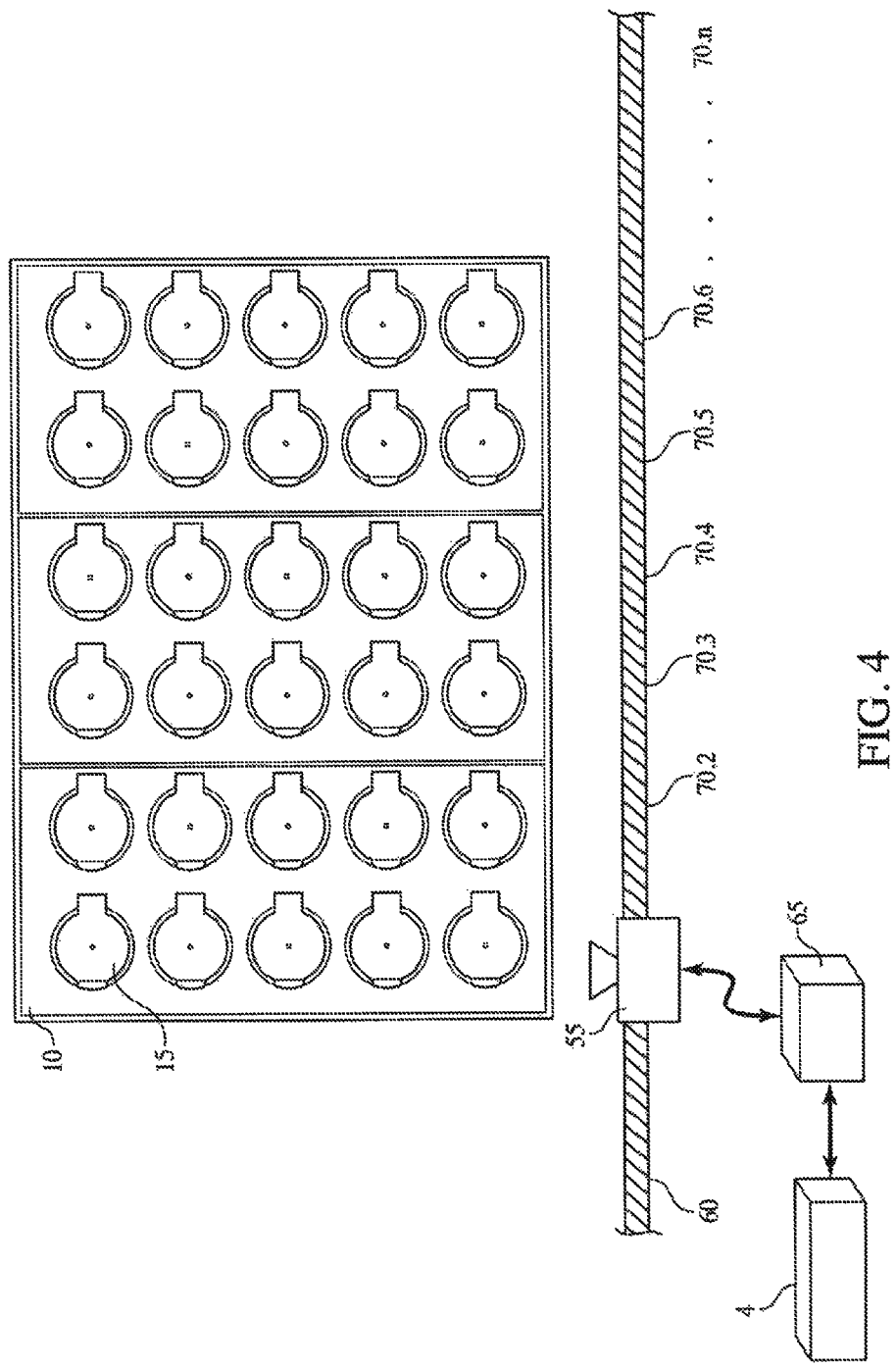
FIG. 4 is a top view of a preferred embodiment of the present invention that includes multiple selector plates and a camera track, along with schematic elements that show the relationship between the verification and material handling systems.

One exemplary embodiment of the present invention involves use of the identification system 2 in conjunction with the transfer of material through physical connection made in a selector plate 10. This process is commonly used in the plastics production and processing industry. As depicted in FIGS. 2, 3 and 4, the selector plate 10 features an array of openings 15. Within each opening 15 on the selector plate 10 is the open end of a source tube 20 which is connected to a source location 6, which contains material to be transferred to destination locations 8 by the material handling system 4. In the exemplary embodiment depicted in FIGS. 2 through 4, each opening 15 is covered by lid 30 that can be opened to access the source tube 20.

Each source tube 20 depicted in the exemplary embodiment shown in FIGS. 2 through 4 is designed to be connected to the open end of a destination tube connector 35 through its respective opening 15. Each destination tube connector 35 is connected to a destination hose 40, which in turn is connected to a destination location 8. As described above, the selector plate 10 in the presently described exemplary embodiment fixes the physical location of each source tube 20 where a physical connection between a source location 6 and a destination location 8 is established. A selector place 10 need not be used in the present invention, and other exemplary embodiments may use alternative means to fix the location of physical connections between a source location 6 and a destination location 8. While fixing the locations of the physical connections between source and destination locations, through the use of a selector plate 10 or other means, facilitates the invention's identification process described below, it is not required.

Each destination tube connector 35 in the presently described embodiment features machine-identifiable indicia 50. The machine-identifiable indicia 50 may be, an optically identifiable indicia, such as, for example, a bar code, a two-dimensional bar code, a letter(s), a number(s), a symbol, a color, a combination of the aforementioned elements, or some other marking that can be recognized by a camera, laser or other device capable of identifying maculae identifiable indicia. Other embodiments of the presently described invention may use other types of machine-readable information that are not readily apparent or distinguishable to the human eye. The placement of the machine-identifiable indicia 50 in the presently described embodiment is on the destination cube connector 35, however, alternative embodiments may include the indicia at other positions which identify a destination location 8. Alternatively, the machine-identifiable indicia 50 can be included on positions which identify the source location 6, or on multiple locations identifying both destination locations 8 and source locations 6.

The exemplary embodiment depicted in FIGS. 2 through 4 features a camera 55 that is used to identify the previously described machine-identifiable indicia 50. The camera 55 in the embodiment described in FIGS. 2 through 4 can view each destination tube connector 35 and each respective machine-identifiable indicia 50 contained thereon. The camera 55 in the presently described embodiment is controlled by a programmable logic controller (PLC) 65. The PLC 65 is also connected to the material handling system 4 to which the identification system 2 transmits identification information.

Each material transfer that is performed by the material handling system 4 in the presently described embodiment utilizes a physical connection between a destination tube connector 35 and a source tube 20 by way of the respective opening 15 in the selector plate 10. Prior to initiating a transfer of material between a source location 6 and a destination location 8, in one exemplary embodiment, the material handling system 4 will direct a human operator to physically connect a tube connector 35 and a source tube 20 by way of the respective opening 15 in the selector plate 10. After such a physical connection is made by the operator, the material handling system 4 in the presently described embodiment will not initiate a material transfer from a source location 6 to a destination location 8 until verification of the physical connection occurs. Generating reliable identification information to accomplish this verification step is described below and represents the heart of the present invention.

After an operator establishes a physical connection, or at other designated points during the material handling process, the PLC 65 in the presently described embodiment instructs the camera 55 to identify each physical connection that has been established in the material handling system 4. The camera 55 in one presently described embodiment accomplishes this by using, for example, optical character recognition (OCR) technology to identity (i) machine-identifiable indicia 50 on destination tube connectors 35 that may be present in the camera's field of vision; and (ii) the relative position of said machine-identifiable indicia 50. Respectively, these two pieces of information serve to identify each destination location 8 and source location 6 that are physically connected to one another. Alternatively, the source location 6 may be identified by machine-identifiable indicia 50 and the destination location 8 may be identified by its relative position.

The invention does not require that the connection between source and destination locations occur in a fixed physical location. In such embodiments, rather than identifying the source or destination location based on the relative position of the conduit connecting source and destination locations, two sets of machine identifiable indicia 50 may be used to identify the source and destination locations. In such embodiments, the camera 55, or other device used to identify machine identifiable indicia 50, will identify each physical connection by identifying each set of machine identifiable indicia 50.

In the presently described embodiment, the camera 55 communicates the identity of each physical connection, as defined by each concoction's machine-identifiable indicia 50 and respective position, to the PLC 65. The PLC 65 in this embodiment then communicates this information to the material handling system 4 which compares each physical connection provided by the PLC 65 (i.e., as identified by the presence of an machine-identifiable indicia 50 in a specific location on the selector plate 10), to the intended connections. If the material handling system 4 determines that each intended connection has been established, the material handling system 4 will commence or continue transferring material from source locations 6 to destination locations 8 through the physical connections.

In an alternative embodiment, the PLC 65 may be programmed with the intended connections and can independently determine whether each physical connection matches an intended connection. Under this embodiment, the material handling system 4 would then be provided with the resultant verification information, which may simply be an indicator that the connections have been verified.

In addition to identifying the physical connections present in a material handling system, the camera 55 and PLC 65 may collect additional information, such as, for example, the time that specific connections are identified, the duration that individual connections are maintained, or other information that may be relevant to the material handling process. This information may be stored in the PLC 65 and transmitted to the material handling system 4.

In the embodiment described in FIGS. 2 and 3, the physical connections between source locations 6 and destination locations 8 are arranged in a manner that the camera 55 need not move to identify each destination tube connector 35 and its respective machine-identifiable indicia 50. However, in alternative embodiments involving larger arrays of openings 15 or multiple selector plates 10, such as the configuration shown in FIG. 4, or in other embodiments where the physical connections between source locations 6 and destination locations 8 are not identifiable from a single vantage point, the camera 55 may be moved to different positions to view the respective physical connections.

As depicted in FIGS. 2-4, the camera in the presently described embodiment can be mounted to a track 60 at one end of the selector plate 10. The PLC 65 controls the movement of the camera 55 along the track 60. It is readily apparent to one of skill in the art that alternative means for moving the camera 55 may be utilized. The track 60 and the camera 55 mounted thereon are positioned such that the camera 55 can observe each destination tube connector 35 and its respective machine-identifiable indicia 50 that may be connected to a source tube 20 through an opening 15 in the selector plate 10. Other embodiments under the present invention exist where the physical connections between source and destination locations are not collected in a relatively compact area such as a selector plate 10, and in such instances, the camera or device used to identify the connections may be moved, repositioned, or aimed by the PLC 65 to capture the necessary identification information.

Where the selector plate 10 in the presently described embodiment features multiple arrays of openings 15, as shown in FIG. 4, the PLC is programmed with camera positions 70.1, 70.2, 70.3, etc. along the track 60. Each camera position 70 is the physical location along the track 60 that provides the camera 55 with an unobstructed view of each destination tube connector 35 that may be connected to a source tube 20 through an opening 15 in the selector plate 10. In this embodiment, the camera performs the same identification process described above at each camera position 70, thereby identifying (i) each machine-identifiable indicia 50 on each destination tube connector 35 that may be present in the camera's field of vision; and (ii) the relative location of said machine-identifiable indicia 50. This information is subsequently sent from the camera to the PLC 65, and then from the PLC 65 to the material handling system 4 as described above.

In other embodiments, the camera 55, laser, or other device used to identify the machine identifiable indicia 50 may be located elsewhere, including, for example, counted on the ceiling, on an overhead tract or cable enabling the device to be used to inspect multiple selector plates throughout the material handling system, or any suitable location that does not interfere with the process.

Although the present invention has been described in detail for the purpose of illustration, it is to be understood that such detail is solely for that purpose and that variations can be made therein by those in the art without departing from the spirit and scope of the invention.

What is claimed is:

1. A material handling system comprising:
    a plurality of material sources for providing material to be transferred;
    a plurality of destination locations for receiving material from the material sources;
    a distribution mechanism having multiple connectors with each of the connectors having machine-identifiable indicia selected from the group consisting of a barcode, two-dimensional barcode, symbol, character, marking, color, and optically identifiable indicia and connected to one of the destination locations and with each connector capable of being selectively connected to one of the material sources for selectively directing material from the selected material source to the selected destination location;
    a detection device including a data collection mechanism that is selected from the group consisting of a video camera, a still camera, a laser, and a photo-sensor arranged near the distribution mechanism and moveably mounted on a track and capable of being repositioned with respect to the distribution mechanism for changing the detection device perspective for detecting the machine-identifiable indicia of each connector; and
    a programmable controller connected to the detection device for comparing the detected machine-identifiable indicia of a selected connector to the selected material source and for initiating transfer from the selected material source to the selected destination location wherein material is transferred from multiple selected material sources to multiple selected destination locations simultaneously and herein the programmable controller records which material source is connected to which destination location and the time period of such connection.

2. The system claim 1 wherein the distribution mechanism comprises a selector plate having an array of openings with each opening capable of having a connector disposed in one end thereof and having the other end thereof connected to a material source.

3. The system of claim 2 further comprising:
    machine-identifiable indicia associated with each material source;
    the detection device arranged for detecting the machine-identifiable indicia of each connector and each material source; and
    the programmable controller comparing the machine-identifiable indicia of the selected material source to the machine-identifiable indicia of the selected destination location.

* * * * *